June 26, 1951  H. C. COGAN  2,558,041
AXIALLY OSCILLATED CIRCULAR WELDING ELECTRODE
Filed Sept. 20, 1949  3 Sheets-Sheet 1

Inventor
HOWARD C. COGAN

Inventor
HOWARD C. COGAN

June 26, 1951      H. C. COGAN      2,558,041
AXIALLY OSCILLATED CIRCULAR WELDING ELECTRODE
Filed Sept. 20, 1949      3 Sheets-Sheet 3
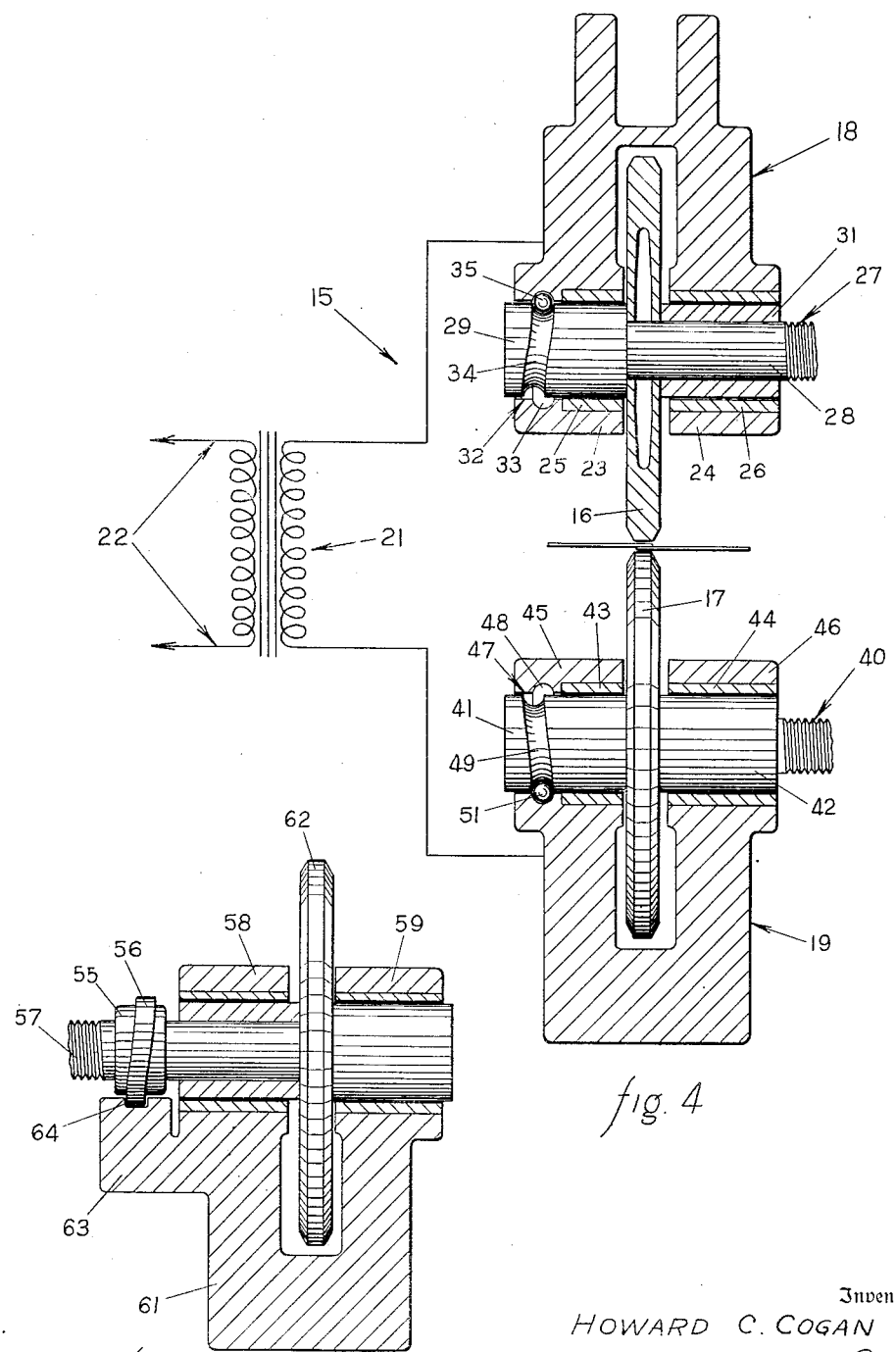
Inventor
HOWARD C. COGAN Patented June 26, 1951

2,558,041

UNITED STATES PATENT OFFICE 2,558,041

AXIALLY OSCILLATED CIRCULAR WELDING ELECTRODE

Howard C. Cogan, Bay City, Mich., assignor to National Electric Welding Machines Company, Bay City, Mich., a corporation of Michigan Application September 20, 1949, Serial No. 116,706

9 Claims. (Cl. 219—4)

1

This invention, which is a continuation in part of the invention in my application Serial No. 731,733, filed March 1, 1947, and entitled "Seam Welding of Cylindrical Articles," now U. S. Patent 2,549,173, granted April 17, 1951, relates in general to circular welding electrodes and more particularly to a means for axially oscillating said circular electrodes.

It is a recognized fact among persons familiar with the operation and fabrication of machines having circular welding electrodes that the pitting in, and wear on, electrically conductive, sleeve type bearings, normally used for rotatably supporting circular welding electrodes upon the welding machine, create a major problem. The pitting results from arcing between the bearings and the shaft supporting the electrode as the high currents pass therebetween when the electrode is being energized. This pitting reduces the effective surface of the bearing, thereby increasing the wear rate of the bearing.

I have discovered, and substantiated by experimental and commercial operation, that a slight axial oscillation of the shaft, upon which the circular welding electrode is mounted, with respect to the bearings supporting the shaft greatly reduces the arcing condition as well as the pitting of the bearing surfaces resulting therefrom.

Accordingly, a primary object of this invention is the provision of a circular welding electrode mounted upon a shaft which is axially oscillated with respect to the supporting bearing surfaces while said electrode is being rotated.

A further object of this invention is the provision of a means whereby the shaft supporting said circular welding electrode may be axially oscillated with respect to the bearings within which it is supported while said electrode is being rotated.

A further object of this invention is the provision of means for substantially reducing the pitting of bearing surfaces rotatably supporting the shaft of a circular welding electrode, due to arcing during the normal operation of the welding electrode, without reducing the welding efficiency of the electrode.

Other objects and purposes of this invention will become apparent to persons familiar with this type of equipment, upon referring to the accompanying drawings and upon reading the following specification.

In meeting those objects and purposes heretofore mentioned, as well as others incidental thereto and associated therewith, I have provided a circular welding electrode secured to and rotatable with a shaft which shaft is rotatably supported upon sleeve bearings mounted within a suitable electrode support member. Means also mounted upon said support member is provided for axially reciprocating said shaft, to which the circular welding electrode is secured, with respect to the bearings.

For illustrations of a preferred embodiment of my invention, attention is directed to the accompanying drawings in which:

Figure 4 illustrates a substantially central cross sectional view of alternate means for supporting and axially oscillating a pair of upper and lower welding electrodes.

Figure 5 is a central cross sectional view of further means for mounting and axially oscillating a circular welding electrode.

Construction

Figures 1, 3:
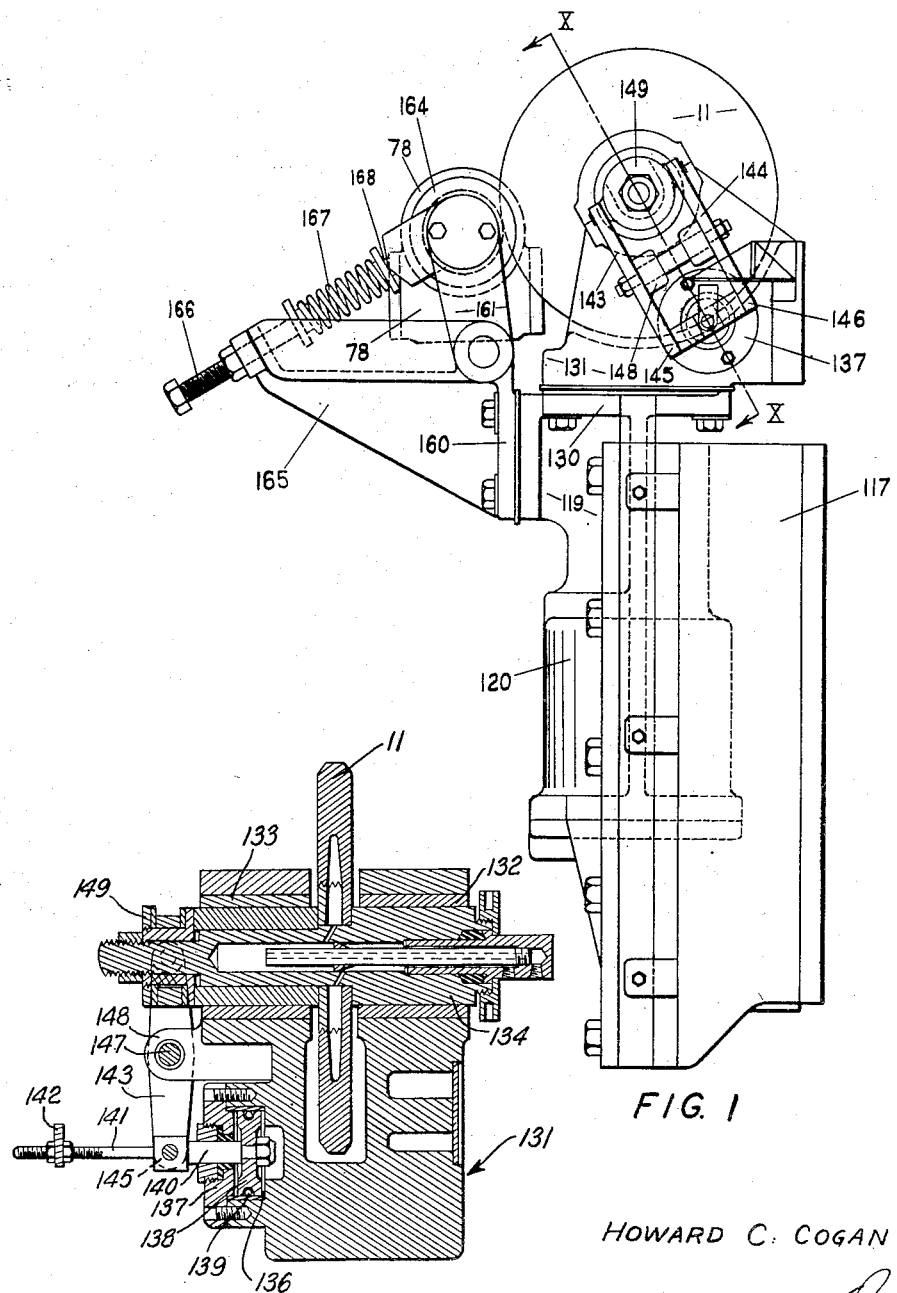
Figure 1 shows a side elevation view of means for supporting and axially oscillating a circular welding electrode, to which this invention relates.
Figure 3 is a sectional view taken along the line X—X of Figure 1.
Figure 2:
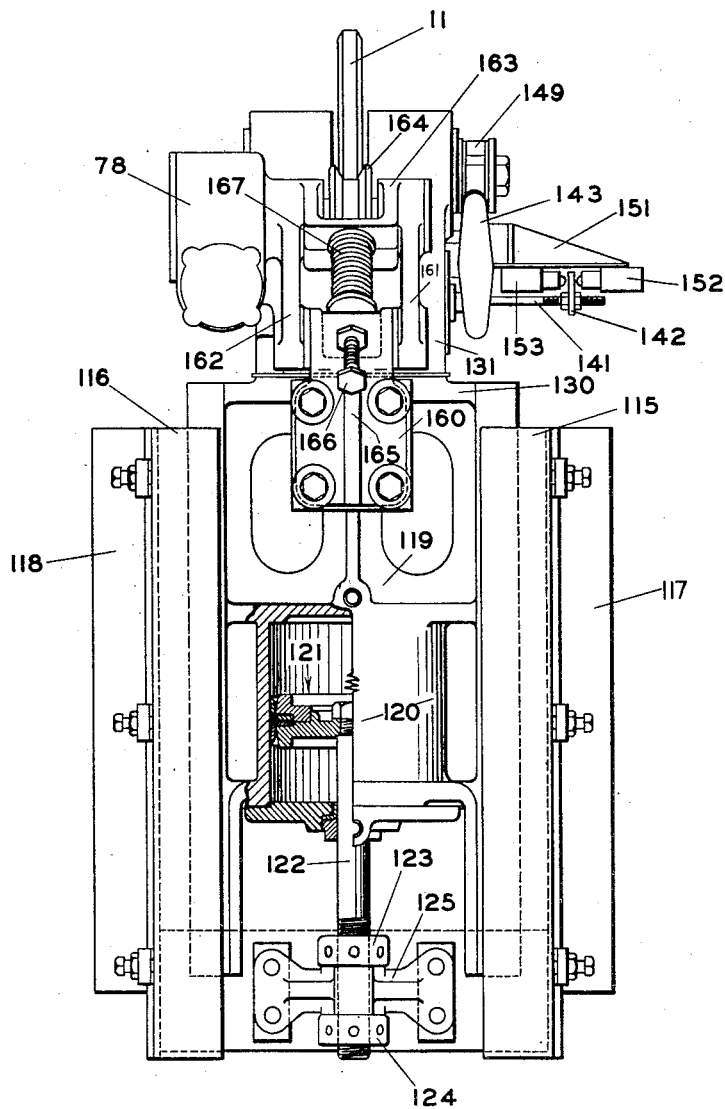
Figure 2 illustrates a front elevation view of said means axially oscillating a circular welding electrode.

As shown in Figures 1 and 2, the lower electrode 11 and associated parts, are supported upon the platform 130 at the upper end of the slide 119, which slide is vertically reciprocable supported between the slides 115 and 116 secured to the angle members 117 and 118, respectively, which angle members are affixed to the rearward end of the welding machine to which my copending application Serial No. 731,733 relates. The terms "upper" and "lower," as used in the following specification, shall be understood to refer to the device described herein, when positioned and/or operating in its normal manner of use. The terms "inwardly" and "outwardly" shall be understood to have reference to the geometric center of the said device.

The terms "rearward" or "rearwardly," as used herein, refer to the leftward side of the means supporting and axially oscillating the circular electrode as shown in Figure 1.

Mounted within the vertically reciprocable slide 119 is the cylinder 120, shown partially sectioned in Figure 2, containing a piston 121 which is operatively connected to a rod 122. The lower end of said rod is threaded and held in vertically adjustable position by the members 123 and 124, and the bracket 125. Said bracket is supported by, and suitably affixed to, the frame of the welding machine as more completely shown in said copending application.

An electrode support 131, by which the circular welding electrode 11 is rotatably supported, is mounted on top of the platform 130. The electrode support 131 (Figure 3) is centrally divided to provide a yoke construction for reception of said circular electrode. The sleeve bearings shown at 132 and 133 have relatively broad bearing areas and are constructed to permit axial movement of the shaft 134 supporting the circular electrode. It will be observed that the axial thickness of said electrode is sufficiently less than the space between the two bearing support arms of the electrode support 131, to permit limited axial movement of said electrode.

At a suitable point within the electrode support 131, there is provided a small cylinder 136 which is closed by a gland 137, preferably bolted in place. A reciprocable piston 138, disposed within said cylinder, is provided with rings 139, and operatively connected to a piston rod 140, having an extension 141 upon which is held a contact member 142, axially adjustable with respect thereto, for purposes appearing hereinafter. A pair of connecting levers 143 and 144, which are pivotally attached at one end 145 and 146 of each, respectively, to said piston rod 140, are centrally pivoted at 147 upon a pair of supports 148 suitably affixed to the bearing housing 131. The other ends of said levers 143 and 144 are pivotally and slidably engaged by means of convenient and well-known type, indicated generally at 149, by which the shaft 134 of the circular electrode 11 will be axially reciprocated, upon reciprocation of the piston 138, without inhibiting the rotation thereof. An arm 151 (Figures 1 and 2), extending sidewardly from the bearing housing 131, carries a pair of sensitive electrical switches 152 and 153. The contact 142, which is disposed between said switches, contacts said switches alternately and, acting through any conventional means (not shown), suitably controls the admission and exhaust of operating fluid into the cylinder 136, Figure 3, by which the piston 138 is caused to reciprocate.

A drive mechanism support 160, which is preferably bolted to the rearward side of the vertically sliding part 119, pivotally supports the lower end of a pair of arms 161 and 162 which, at their respective upper ends, support the yoke shaped guide member 163 holding the guide wheel 164. The drive support 160 has a rearwardly extending arm 165 adjustably supporting a bolt 166 which engages one end of a resilient means, such as the coiled spring 167 whose other end contacts the lower end 168 of the yoke guide member 163. Thus, the engagement, as well as the amount of contact pressure, between the driving wheel and the circular electrode is controlled by the bolt 166. The driving wheel 164 may be driven by means, including the gear box 78, of any convenient, conventional type.

Alternate construction

As shown in Figure 4, the alternate structure 15 for axially reciprocably and rotatably supporting upper and lower circular electrodes 16 and 17, respectively, is comprised of a pair of upper and lower electrode supports 18 and 19 mountable upon a conventional welding machine, such as that disclosed in my said copending application in substantially the same manner as the electrode support 131. The bearing supports 18 and 19 are electrically connected to a transformer 21 which is energized through the supply lines 22.

The upper electrode support 18 is provided with a pair of bearing support arms 23 and 24 having sleeve bearings 25 and 26, respectively. The sleeve bearing 26 extends entirely through the arm 24. However, the sleeve bearing 25, which is preferably flush with that side of the arm 23 adjacent to the arm 24, extends one partially through the bearing arm 23. The large portion 29 of a shaft 27 having a portion 28 of reduced diameter is rotatably supported within the sleeve bearing 25. The upper electrode 16 is supported upon and secured to the reduced portion 28 of the shaft 27 adjacent to the enlarged portion 29 thereof. A collar 31, which is secured upon the reduced portion 28 snugly adjacent to the upper electrode 16, is preferably substantially equal in outside diameter to the diameter of the enlarged portion 29 and is rotatably supported within the sleeve bearing 26 in the arm 24. Since the sleeve 25 extends only partially through the arm 23, the arm 23 is provided with a circular opening 32 adjacent to and co-axial with the sleeve bearing 25 and of a slightly larger diameter than the inside diameter of the sleeve 25.

An annular groove 33, having a semi-circular cross section, is provided in the sidewalls of the opening 32 and preferably defines a plane perpendicular to the axis of the opening 32. The enlarged portion 29 of the shaft 27 is provided with an annular groove 34 having a semi-circular cross section of substantially the same radius as the annular groove 33 and defining a plane disposed at an angle to the axis of said shaft. The degree of this angle is primarily dependent upon the amount of axial reciprocation desired for the shaft 27 and is limited by the space between the arms 23 and 24 between which the circular electrode 16 must move while said shaft 27 is being reciprocated. A ball 35 is snugly, but rotatably, disposed within and between the grooves 33 and 34.

The lower circular electrode 17 is rotatably supported upon a shaft 40, which may be substantially identical to the shaft 27, between the enlarged portion 41 thereof and a collar 42 secured to said shaft.

The enlarged portion 41 of the shaft 40 and the collar 42 are rotatably supported within the bearings 43 and 44 in the arms 45 and 46, respectively, of the electrode support member 19. The sleeve 43, like the sleeve 25, extends only partially through the arm 45. An opening 47 in the arm 45 adjacent to, and co-axial with, the sleeve 43 is provided with an annular groove 48 preferably similar to the groove 33. The enlarged portion 41 is provided with an angularly disposed annular groove 49 preferably similar to the groove 34 in the shaft 27. A ball 51 is rotatably and snugly disposed within and between the grooves 48 and 49 for effecting an axial oscillation of the shaft 40 when said shaft is rotated. The spacing between the bearing arms 45 and 46, as in the case of the bearing arms 23 and 24, is sufficient to permit appropriate axial movement of the lower circular electrode 17 when the shaft 40 is axially reciprocated.

Figure 5 illustrates a further alternate construction of my invention in which a cylindrical collar, having an outwardly extending, annular boss secured thereto, is mounted upon and secured to the shaft 57. The shaft 57 is rotatably and axially reciprocably supported within the bearing arms 58 and 59 of the electrode support member 61. The circular electrode 62 is secured to, and supported upon, the shaft 57 between the bearing arms 58 and 59, said arms being spaced sufficiently from each other to permit axial reciprocation of the circular electrode 62. A guide arm 63, having a groove 64 preferably conforming to the outside contour of the annular boss 56 on the collar 55, is secured to, or integral with, the electrode support member 61. The annular boss 56 preferably defines a plane disposed at an angle to the axis of the collar 55. Accordingly, rotation of the shaft 57, hence the collar 55 and the annular boss 56, effects an axial oscillation of the shaft 57 when the annular boss 56 is engaged by the groove 64 in the guide arm 63.

*Operation*

Assuming that the piston 138 (Figure 3) is at the inner end of its stroke within the cylinder 136 as the circular electrode 11 begins to rotate, the contact member 142 will then be in engagement with the electrical switch 153 (Figure 2). Accordingly, since the electric switches 152 and 153 are energized as soon as the circular electrode 11 begins to rotate, this engagement of the electrical switch 153 by the tab 142 effects a flow of hydraulic fluid from the outside of the piston 138 to the inside thereof, thereby causing the piston 138 and the rod 141 to move outwardly until the actuating tab 142 engages the other electrical switch 153. This contact again changes the direction of flow of hydraulic fluid within the cylinder 136, thereby causing the piston to move inwardly and the tab 142 to re-engage the electrical switch 152. This oscillatory cycle of the piston 138, piston rod 141 and tab 142, which will continue as long as the electrode 11 continues to rotate, effects equal and opposite axial reciprocations of the shaft 134 and circular electrode 11 supported thereon, through the connecting levers 143 and 144.

The shaft 27 and circular electrode mounted thereon in the alternate structure 15, are axially oscillated with respect to the electrode support 18 by the interaction of the grooves 33 and 34 in the bearing arm 23 and enlarged portion 29 of the shaft 27, respectively, with the ball 35 which is rotatably disposed within and between said grooves 33 and 34. In a similar manner, the interaction of the grooves 49 in the bearing arm 45 and the enlarged portion 41 of the shaft 40 with the ball 51, which is rotatably disposed within and between said grooves 48 and 49, effects an axial oscillation of the shaft 40, and the circular electrode 17 secured thereto, with respect to the electrode support 19. In both cases, the axial oscillation is due to the fact that the grooves 48 and 49 define planes which are angularly disposed to planes defined by the grooves 33 and 34.

The angular disposition of a plane defined by the annular boss 56 on the collar 55 (Figure 5) interacting with the groove 64 in the guide arm 63 secured to the electrode support member 61 effects an axial oscillation of the shaft 57, and circular electrode 62 supported thereon, with respect to the electrode support member 61.

In each or any of the three above described alternate embodiments of my invention, it will be recognized that the amount of oscillation of the shaft with respect to the means supporting said shaft may, in each case, be reasonably small, such as less than a half inch for an electrode of 8 inches diameter. However, this small, axially reciprocal movement greatly reduces the pitting and resultant wear of the bearings supporting the shaft, thereby increasing the life of operation of a circular electrode so mounted, without impeding the efficiency of operation of the electrode.

Although the above mentioned drawings and description apply to one particular, preferred embodiment of my invention, it is not my intention, implied or otherwise, to eliminate other variations or modifications which do not depart from the scope of the invention unless specifically stated to the contrary in the hereinafter appended claims.

I claim:

1. In means for preventing pitting of a pair of spaced, coaxial, electrically conductive sleeve bearings rotatably supporting a shaft having a circular welding electrode secured thereto between said bearings, supporting means for said bearings and cooperating means mounted upon said supporting means and upon said shaft effecting axial reciprocation of the shaft with respect to said bearings.

2. In means for preventing pitting of a pair of spaced, coaxial, electrically conductive sleeve bearings rotatably supporting a shaft having a circular welding electrode secured thereto between said bearings, the combination comprising: a member supporting the bearings; a cylinder within said member and coaxial with said shaft; a piston reciprocably disposed within said cylinder and a piston rod secured thereto and extending outwardly of said member; a lever bar pivotally supported intermediate its ends upon said member, one end of said lever being pivotally secured to said rod and the other end thereof being pivotally and rotatably supported upon said shaft; and means effecting axial reciprocation of said piston whereby said shaft is axially reciprocated.

3. In means for preventing pitting of a pair of spaced, coaxial, electrically conductive sleeve bearings rotatably supporting a shaft having a circular welding electrode secured thereto between said bearings, the combination comprising: a member supporting the bearings; means secured to said member having a cylindrical opening therein coaxial with and encircling said shaft, the walls of said opening having an internal, annular groove therein; means defining an external annular groove in said shaft, the external groove intersecting said internal groove at at least one point and being disposed at an angle thereto; and a spherical bearing disposed snugly and rotatably within and between said grooves at said point, whereby upon rotation of said shaft said spherical bearing effects an axial movement thereof.

4. In means for preventing pitting of a pair of spaced, coaxial, electrically conductive sleeve bearings rotatably supporting a shaft having a circular welding electrode secured thereto between said bearings, one end of said shaft extending beyond said bearings, the combination comprising: a member supporting the bearings; an arm secured to and extending from said member substantially parallel with and adjacent to the extended end of said shaft, said arm having a groove therein facing said shaft; a collar secured upon the extended end of said shaft and having an annular ridge extending outwardly therefrom and defining a plane disposed at angle to the axis thereof said groove being slidably engaged by said ridge, whereby rotation of said shaft effects an axial movement thereof.

5. In means for preventing pitting of a pair of spaced, coaxial, electrically conductive sleeve bearings rotatably supporting a shaft having a circular welding electrode secured thereto between said bearings, the combination comprising: a member supporting the bearings; a lever bar pivotally supported intermediate its ends upon said member, one end of said lever being pivotally and rotatably supported upon said shaft; reciprocable means pivotally secured to the other end of said lever; and means for effecting reciprocation of said reciprocable means in a direction substantially parallel with the axis of said shaft whereby said shaft is axially reciprocated.

6. In means for preventing pitting of a pair of spaced, coaxial, electrically conductive sleeve bearings rotatably supporting a shaft having a circular welding electrode secured thereto between said bearings, the combination comprising: a member supporting the bearings; first means rotatably supported upon said shaft; and second means supported upon said member effecting reciprocation of said first means in a direction substantially parallel with the axis of said shaft whereby said shaft is axially reciprocated.

7. In means for preventing pitting of an electrically conductive bearing rotatably supporting a shaft having a circular welding electrode secured thereto, the combination comprising: a support for said bearing; means including a cam follower fixed with respect to said support; and a cam on said shaft engageable by said cam follower whereby rotation of said shaft effects an axial movement thereof with respect to said bearing.

8. In means for preventing pitting of a pair of spaced, coaxial, electrically conductive sleeve bearings rotatably supporting a shaft having a circular welding electrode secured thereto between said bearings, the combination comprising: a member supporting the bearings; means including a cam secured to said member; and means including a cam follower on said shaft engageable with said cam whereby rotation of said shaft effects an axial movement thereof with respect to said bearings.

9. In means for preventing pitting of a pair of spaced, coaxial, electrically conductive sleeve bearings rotatably supporting a shaft having a circular welding electrode secured thereto between said bearings, the combination comprising: a member supporting the bearings; means including a first cam secured to said member; means including a second cam on said shaft; and a cam follower mutually engageable with said cams, whereby rotation of said shaft effects an axial movement thereof with respect to said bearings.

HOWARD C. COGAN.

REFERENCES CITED

The following references are of record in the file of this patent:

UNITED STATES PATENTS

| Number | Name | Date |
| --- | --- | --- |
| 1,603,807 | Schaer | Oct. 19, 1926 |
| 2,280,111 | Widell | Apr. 21, 1942 |